US011521078B2

(12) United States Patent
Croutwater et al.

(10) Patent No.: US 11,521,078 B2
(45) Date of Patent: Dec. 6, 2022

(54) LEVERAGING ENTITY RELATIONS TO DISCOVER ANSWERS USING A KNOWLEDGE GRAPH

(71) Applicant: International Business Machines Corporation, Armonk, NY (US)

(72) Inventors: Kyle Croutwater, Chapel Hill, NC (US); Zhe Zhang, Cary, NC (US); Le Zhang, Cary, NC (US); Vikrant Verma, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 739 days.

(21) Appl. No.: 16/508,000

(22) Filed: Jul. 10, 2019

(65) Prior Publication Data

US 2021/0012217 A1 Jan. 14, 2021

(51) Int. Cl.
*G10L 15/20* (2006.01)
*G06N 5/02* (2006.01)
*G06F 16/2455* (2019.01)
*G06F 40/30* (2020.01)

(52) U.S. Cl.
CPC ........... *G06N 5/02* (2013.01); *G06F 16/2455* (2019.01); *G06F 40/30* (2020.01)

(58) Field of Classification Search
CPC ................................. G06F 17/30; G10L 15/22
See application file for complete search history.

(56) References Cited

U.S. PATENT DOCUMENTS

| 2013/0007033 A1 | 1/2013 | Brown |
| 2014/0280307 A1 | 9/2014 | Gupta |
| 2015/0095303 A1 | 4/2015 | Sonmez |
| 2016/0203412 A1 | 7/2016 | Merdivan et al. |
| 2016/0378851 A1 | 12/2016 | Merdivan et al. |
| 2017/0098163 A1 | 4/2017 | Chandrasekaran et al. |
| 2017/0103069 A1 | 4/2017 | Brennan et al. |

(Continued)

FOREIGN PATENT DOCUMENTS

| CN | 108052547 A | * | 5/2018 | ......... G06F 16/3329 |
| CN | 109033229 B | * | 6/2021 | |
| CN | 109033374 B | * | 3/2022 | ........... G06K 9/6256 |

OTHER PUBLICATIONS

Socher et al., "Reasoning With Neural Tensor Networks for Knowledge Base Completion," NIPS'13 Proceedings of the 26th International Conference on Neural Information Processing Systems—vol. 1, Lake Tahoe, Nevada, Dec. 2013, pp. 926-934.

(Continued)

*Primary Examiner* — Shreyans A Patel
(74) *Attorney, Agent, or Firm* — VanLeeuwen & VanLeeuwen; Brian D. Welle

(57) ABSTRACT

An approach is provided that receives a question at a question-answering (QA) system. A number of passages are identified that are relevant to the received question. A question knowledge graph is generated that corresponds to the question and a set of passage knowledge graphs are also generated with each passage knowledge graph corresponding to one of the identified passages. Each of the passage knowledge graphs are compared to the question knowledge graph with the comparison resulting in a set of knowledge graph candidate answers (kgCAs). A set of candidate answers (CAs) is computed by the QA with at least one of the CAs being based on one of the kgCAs.

14 Claims, 7 Drawing Sheets

(56) References Cited

U.S. PATENT DOCUMENTS

| | | |
|---|---|---|
| 2017/0109355 A1 | 4/2017 | Li et al. |
| 2017/0124217 A1 | 5/2017 | Hassanzadeh et al. |
| 2018/0075359 A1 | 3/2018 | Brennan et al. |
| 2018/0089305 A1 | 3/2018 | Croutwater et al. |
| 2018/0089569 A1 | 3/2018 | Croutwater et al. |
| 2019/0370413 A1* | 12/2019 | Sehgal .................. G06N 5/022 |

OTHER PUBLICATIONS

Gardner, "Reading and Reasoning with Knowledge Graphs," Carnegie Mellon University, Pittsburgh, Pennsylvania, 2015, 147 pages.
Trivedi et al., "Know-Evolve: Deep Temporal Reasoning for Dynamic Knowledge Graphs," Proceedings of the 34th International Conference on Machine Learning, Sydney, Australia, Aug. 2017, 15 pages.
"List of IBM Patents or Patent Applications Treated as Related," Letter from Leslie A. Van Leeuwen, Jul. 10, 2019, 1 page.
Croutwater et al., "Expanding Knowledge Graphs Using External Data Source," U.S. Appl. No. 16/508,038, filed Jul. 10, 2019, 43 pages.

\* cited by examiner

LEVERAGING ENTITY RELATIONS TO DISCOVER ANSWERS USING A KNOWLEDGE GRAPH

BACKGROUND

Question answering (QA) is a computer science discipline within the fields of information retrieval and natural language processing (NLP), which is concerned with building systems that answer questions posed by humans in a natural language. A QA implementation, usually a computer program, may construct its answers by querying a structured database of knowledge or information, usually a knowledge base, or "corpus." QA systems can ingest data from an unstructured collections of natural language documents, such as documents found on the Internet. The data is ingested into the QA system's corpus in a format that makes the data more readily available to the QA system than having to search through unstructured documents. Examples of natural language document collections that might be ingested and used by a QA system can include reference texts, organization documents and web pages, newswire reports, online encyclopedia pages, and other pages of data found on the Internet.

QA research attempts to deal with a wide range of question types including: fact, list, definition, how, why, hypothetical, semantically constrained, and cross-lingual questions. Closed-domain QA systems are directed to handling questions under a specific domain, such as medicine, computer technology, auto maintenance, etc. Closed-domain QA systems exploit domain-specific knowledge frequently formalized in ontologies. In contrast, open-domain QA systems handle questions about virtually anything, and rely on general ontologies and world knowledge. Because of their extensiveness, open-domain QA systems typically have more data available in their corpus from which to extract the answer than their closed-domain counterparts.

QA systems rely heavily on natural language processing (NLP) in both ingesting and making sense of documents as well as understanding the question posed by the user. NLP determines the entities found in text using a variety of methods. For example, given the sentence "Paris is the capital of France", the NLP process determines that "Paris" refers to the city of Paris and not to a celebrity named "Paris" or any other entity that could be referred as "Paris."

Entity linking uses a knowledge base containing the entities to which entity mentions can be linked. A common choice for entity linking on open domain text are knowledge-bases based on online encyclopedias in which each page is regarded as a named entity. A knowledge base can also be induced from training text or can be manually built. Named entity mentions can be highly ambiguous; any entity linking method must address this inherent ambiguity. Various approaches to tackle this problem have been tried to date. These approaches include supervised learning that is employed using the anchor texts of online encyclopedia entities as training data, collecting training data based on unambiguous synonyms, and exploiting common properties that topically coherent documents refer to entities belonging to strongly related types.

Current approaches analyze relations between entities to provide supporting features and generate candidate answers provided by the QA system often relying heavily on entity disambiguation, which includes PERSON, GPE, ORGANIZATION, etc., based on the type of QA system that is being used. In traditional approaches, the entity itself is not considered as part of the data found in knowledge graphs. While entity data and relations between entities provide valuable information, traditional approaches fail to properly leverage this information. For example, if a question such as "what U.S. president visited England and signed an environment treaty?" is posed to a QA system, traditional approaches search and find the president's name in document text. However, using traditional approaches, a correct answer is not found if no such president name exists in the same passage satisfying the attributes of the event referenced in the question.

SUMMARY

An approach is provided that receives a question at a question-answering (QA) system. A number of passages are identified that are relevant to the received question. A question knowledge graph is generated that corresponds to the question and a set of passage knowledge graphs are also generated with each passage knowledge graph corresponding to one of the identified passages. Each of the passage knowledge graphs are compared to the question knowledge graph with the comparison resulting in a set of knowledge graph candidate answers (kgCAs). A set of candidate answers (CAs) is computed by the QA with at least one of the CAs being based on one of the kgCAs.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention will be apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Figure 1:
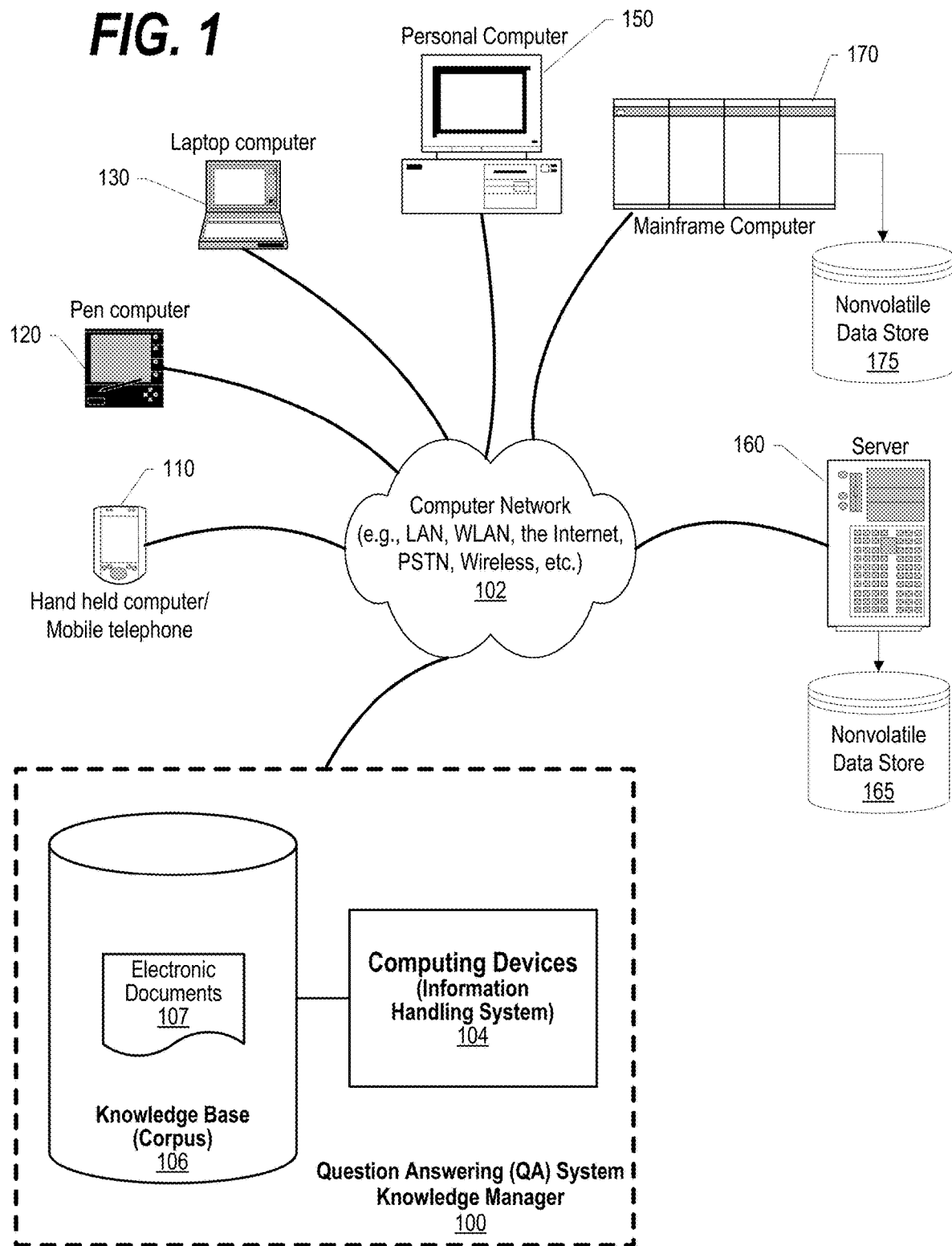
FIG. 1 depicts a network environment that includes a knowledge manager that utilizes a knowledge base.

FIGS. 1-7 describe an approach that leverages entity-relation data from knowledge graphs (KGs) and computes similarity scores to find missing information for entities and also boost scores of candidate answers in order to better rank correct answers (with a reasonable/trustful answer). This approach employs Knowledge Graph reasoning that focuses on the analysis of knowledge graphs and finds occurrences of entities in the graphs. The approach matches the KG entity by using a threshold and calculates candidate answer (CA) scores to boost CA in the Question answering system.

In one embodiment, the approach includes two phases: (1) a Candidate Answer Generator phase, and (2) a Candidate Answer Scorer phase. During the Candidate Answer Generator phase, the approach processes the question and the passages coming from an existing QA pipeline through a knowledge graph database. This process expands the graph by adding neighbors to existing entities using common relations with the neighbors being added from the external data used to expand the graph, such as an online encyclopedia. The approach then computes a vector space similarity score using a predefined threshold to decide if the external data refers to the same activity entity and then generates a list of candidate answers.

During the Candidate Answer Scorer phase, for each candidate answer generated from the previous phase are stored as a Knowledge Graph (KG) score (KG-score) along with a KG-Boolean value that indicates whether this candidate answer already exists in the existing candidate answer list that was generated by the traditional QA pipeline. In one embodiment, a final result is generated by combining the KG-score and the KG-Boolean. This process results in the inclusion of new candidate answers that were not generated by the traditional QA pipeline as well as boosting the scores of candidate answers generated by the traditional QA pipeline that were also found by the KG analysis described herein. By using both candidate answers from the traditional QA pipeline with additional data derived from KG graph analysis, the approach results in an improved QA system that is more likely to find the correct answer to the question submitted to the QA system.

In more detail, the Candidate Answer Generator phase first creates a knowledge graph database from a corpus, such as an online encyclopedia or other external knowledge base. In the created knowledge graph database, each node represents entities and the edges between nodes represent relations between two nodes/entities. When a question is submitted, the approach extracts entities and relations from the question text and create a KG like data structure that includes the entity or relation that is missing from the question. For example, if the question submitted is: "What president visited England who signed environment treaty?", the missing entity will be the name of a president.

The approach runs this KG data through the knowledge graph database that was previously created with the approach having the capability of expanding this knowledge graph by adding neighbor entities using common relations. The question also goes through a traditional QA where it generates list of passages (and later generates candidate answers from this list of passages). Each of these passages follow the same steps above and generates an expanded graph. The approach then compares the expanded graphs resulting from each passage with the expanded graph of the question to compute the similarity score based on the attributes of the graphs using a vector space model. Entities from passages that match the missing entity from the question are extracted as candidate answers. In one embodiment, the entities are added to a list of candidate answers when their similarity score is above a pre-defined threshold, signifying that the graphs are significantly similar.

In further detail, the Candidate Answer Scorer process stores the similarity scores for each candidate answer as a new feature/scorer: (KG-score). The generated candidate answer list is then compared with the candidate answer list that was generated by the traditional QA pipeline. This process populates the value of another feature called "KG-Boolean" that indicates whether a given candidate answer was found by both the traditional QA pipeline as well as the KG graph analysis process disclosed herein. In case of a match, the approach sets KG-Boolean to TRUE, otherwise KG-Boolean is set to FALSE.

The addition of these two features results in additional new candidate answers being added to the candidate answer list from the knowledge graph database analysis, as well as boosting scores of candidate answers that were found by both the traditional QA pipeline approach as well as the knowledge graph database analysis approach. The inclusion of new candidate answers and boosting of scores results in an improved set of scores used to rank the candidate answer list. The QA pipeline then continues with its remaining steps used to select one or more candidate answers as the most likely answer to the question submitted to the QA system.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 depicts a schematic diagram of one illustrative embodiment of a question/answer creation (QA) system 100 in a computer network 102. QA system 100 may include a knowledge manager computing device 104 (comprising one or more processors and one or more memories, and potentially any other computing device elements generally known in the art including buses, storage devices, communication interfaces, and the like) that connects QA system 100 to the computer network 102. The network 102 may include multiple computing devices 104 in communication with each other and with other devices or components via one or more wired and/or wireless data communication links, where each communication link may comprise one or more of wires, routers, switches, transmitters, receivers, or the like. QA system 100 and network 102 may enable question/answer (QA) generation functionality for one or more content users. Other embodiments of QA system 100 may be used with components, systems, sub-systems, and/or devices other than those that are depicted herein.

QA system 100 may be configured to receive inputs from various sources. For example, QA system 100 may receive input from the network 102, a corpus of electronic documents 107 or other data, a content creator, content users, and other possible sources of input. In one embodiment, some or all of the inputs to QA system 100 may be routed through the network 102. The various computing devices on the network 102 may include access points for content creators and content users. Some of the computing devices may include devices for a database storing the corpus of data. The network 102 may include local network connections and remote connections in various embodiments, such that knowledge manager 100 may operate in environments of any size, including local and global, e.g., the Internet. Additionally, knowledge manager 100 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, the content creator creates content in electronic documents 107 for use as part of a corpus of data with QA system 100. Electronic documents 107 may include any file, text, article, or source of data for use in QA system 100. Content users may access QA system 100 via a network connection or an Internet connection to the network 102, and may input questions to QA system 100 that may be answered by the content in the corpus of data. As further described below, when a process evaluates a given section of a document for semantic content, the process can use a variety of conventions to query it from the knowledge manager. One convention is to send a well-formed question. Semantic content is content based on the relation between signifiers, such as words, phrases, signs, and symbols, and what they stand for, their denotation, or connotation. In other words, semantic content is content that interprets an expression, such as by using Natural Language (NL) Processing. Semantic data 108 is stored as part of the knowledge base 106. In one embodiment, the process sends well-formed questions (e.g., natural language questions, etc.) to the knowledge manager. QA system 100 may interpret the question and provide a response to the content user containing one or more answers to the question. In some embodiments, QA system 100 may provide a response to users in a ranked list of answers.

In some illustrative embodiments, QA system 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question.

Types of information handling systems that can utilize QA system 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 102. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 1 depicts separate nonvolatile data stores (server 160 utilizes nonvolatile data store 165, and mainframe computer 170 utilizes nonvolatile data store 175. The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
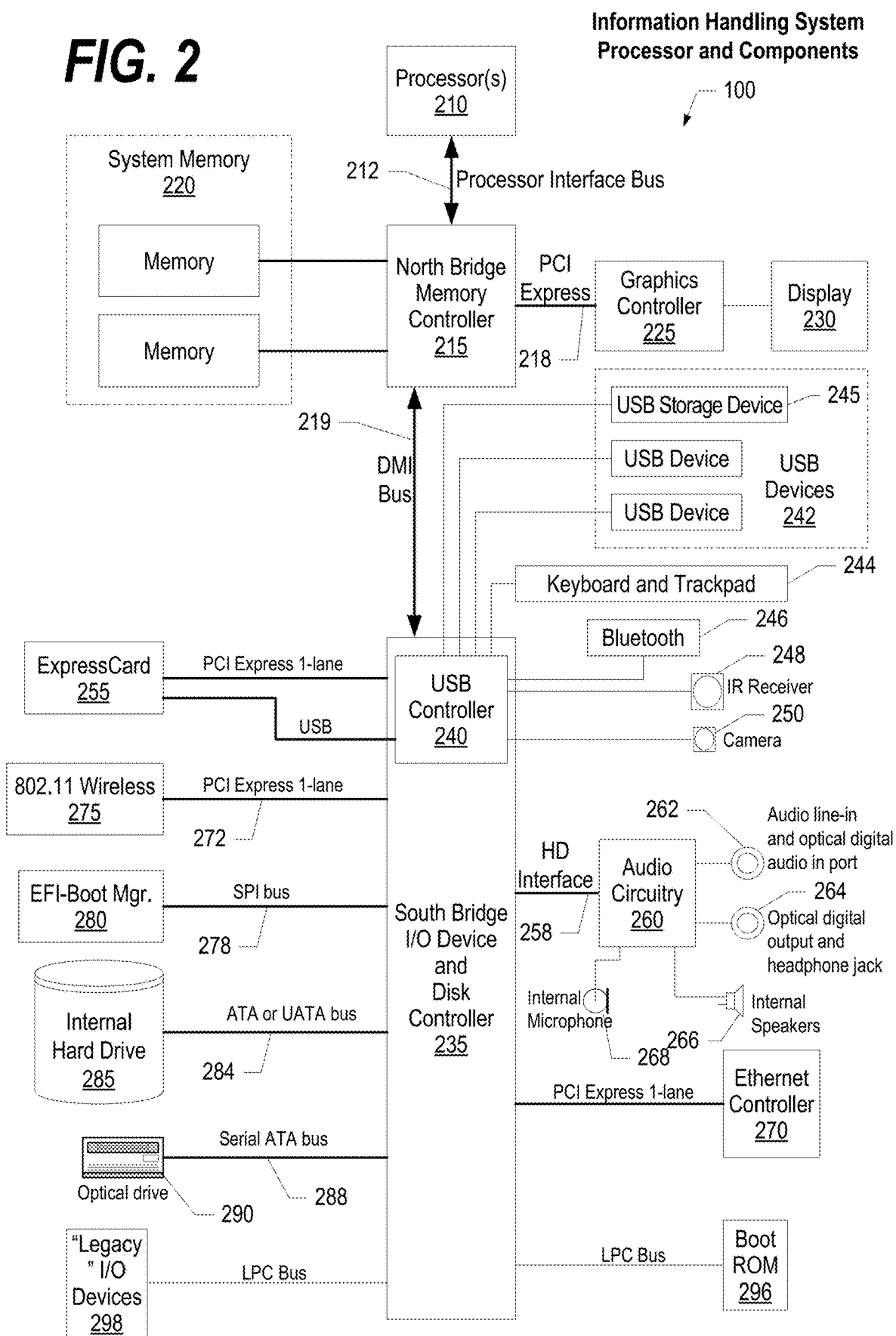
FIG. 2 is a block diagram of a processor and components of an information handling system such as those shown in FIG. 1.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. The LPC bus also connects Southbridge 235 to Trusted Platform Module (TPM) 295. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etcetera.

Wireless Local Area Network (LAN) device 275 connects to Southbridge 235 via the PCI or PCI Express bus 272. LAN device 275 typically implements one of the IEEE 0.802.11 standards of over-the-air modulation techniques that all use the same protocol to wireless communicate between information handling system 200 and another computer system or device. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

Figure 3:
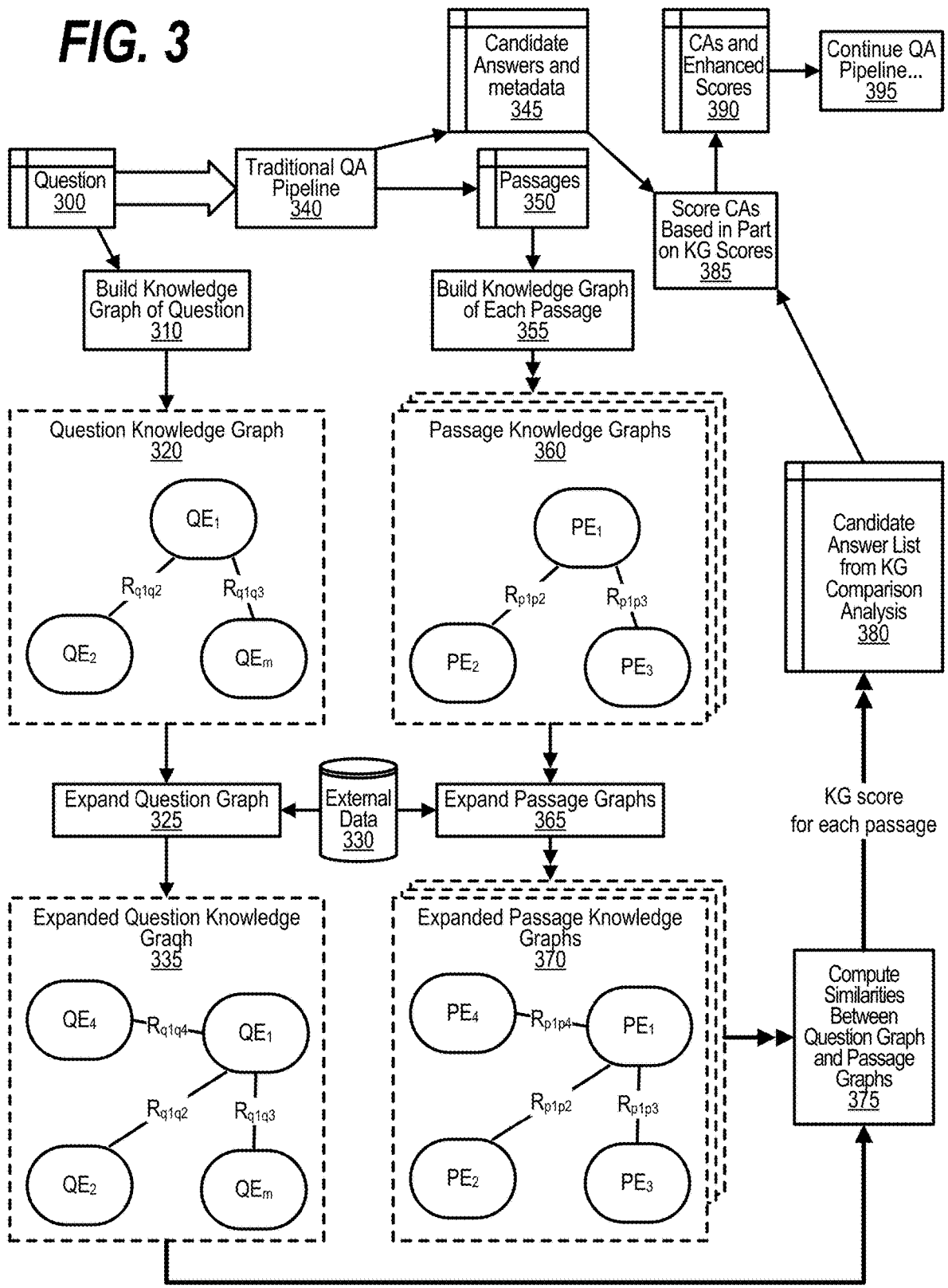
FIG. 3 is a component diagram that shows the various components included in a system that leverages entity relations to discover answers using a knowledge graph.

FIG. 3 is a component diagram that shows the various components included in a system that leverages entity relations to discover answers using a knowledge graph. Question 300 that is input by a requestor, such as a user, is shown being input to the system. At the top of the diagram, processing of the question is depicted by traditional QA pipeline 340 that uses traditional approaches to identify candidate answers and metadata (e.g., scores, etc.) pertaining to such candidate answers which are shown as being stored in memory area 345. In addition, the traditional QA pipeline identifies passages of text that are relevant to the question with these passages being stored in memory area 350.

Leveraging of knowledge graph data to discover candidate answers is shown starting at process 310 that builds a knowledge graph of question 300. One or more of the candidate answers that are discovered by the knowledge graph analysis can be the same as or candidate answers discovered by the traditional QA pipeline approach with scoring of such candidate answers being boosted. In addition, some candidate answers discovered by the analysis of the knowledge graphs can be new, or different than, the candidate answers that were discovered by the traditional QA approach in which case such candidate answers are added to the list of possible candidate answers. The result of process 310 is question knowledge graph 320. The example shown in graph 320 shows two "known" question entities that were provided by the question ($QE_1$ and $QE_2$) as well as a "missing" question entity ($QE_m$) that is the missing entity to which the question seeks an answer. Relations (relationships) are also shown between the various entities. While the initial question knowledge graph (320) and the initial passage knowledge graphs (360) can be analyzed and used to identify candidate answers based on the knowledge graphs, in one embodiment, the knowledge graphs are "expanded" using known, reliable data, such as an online encyclopedia that is depicted being retrieved from external data store 330. The expanded knowledge graphs are used to identify additional entities and relations that might not be readily found in the question and passage data. If knowledge graph expansion is being used, then process 325 is used to expand the question knowledge graph (320) to form expanded question knowledge graph 335.

Regarding passages, process 355 is used to build knowledge graphs for each of the passages that were identified by the traditional QA pipeline. Process 355 thereby forms passage knowledge graphs 360. Again, if graph expansion is being utilized, then a process (process 365) is performed to expand each of the passage knowledge graphs 360 to create expanded passage knowledge graphs 370.

Process 375 computes similarities between the question knowledge graph (graph 320 or graph 335 if expansion is used) and each of the passage knowledge graphs (graph 360 or graph 370 if expansion is used). The process attempts to identify entities in passage knowledge graphs that the analysis indicates correspond to the "missing" entity from the question knowledge graph. Using the example shown, the "missing" entity found in the question knowledge graphs ($QE_m$) appears to correspond, based on the other entities and relations, to $PE_3$ in the passage knowledge graph that is shown. While $PE_3$ is depicted in both the unexpanded and the expanded knowledge graphs for graph simplicity, it is possible that a different entity in the expanded knowledge graph corresponds well to the missing entity (e.g., a new entity "$QE_5$," not shown, etc.). The identification of additional candidate answers by process 375 also computes a similarity score that, in one embodiment, indicates the similarity of the passage knowledge graph from which the candidate answer was found to the question knowledge graph so that graphs that are highly similar are scored higher than graphs that are less similar. The identified candidate answers and their corresponding scores are stored in memory area 380.

Process 385 combines the candidate answers identified by the traditional QA pipeline process with the candidate answers that were identified by the analysis of the knowledge graphs that was described above. In one embodiment, candidate answers that were identified by both the traditional QA pipeline process and the knowledge graph analysis process have their scores "boosted." In one embodiment, the amount of the boost to the candidate answer's traditional score found in memory area 345 is based on the score of the candidate answer that was based on the knowledge graph similarity that was stored in memory area 380. The candidate answer and its "boosted" score are stored in memory area 390. In one embodiment, if a candidate answer is only found in memory area 380 (indicating that the candidate answer was found by the knowledge graph analysis process but not by the traditional QA pipeline process), then this candidate answer is added to the list of possible candidate answers in memory area 390 with its score being based on the knowledge graph similarity score that was stored in memory area 380. Traditional QA pipeline process is shown continuing at 395 with the pipeline process using the candidate answers and scores stored in memory area 390 with some of these candidate answers and scores being influenced by the knowledge graph analysis described above. The continued QA process eventually results in one or more candidate answers being selected as the most likely answer(s) to the question (question 300) that was initially input to the system.

Figure 4:
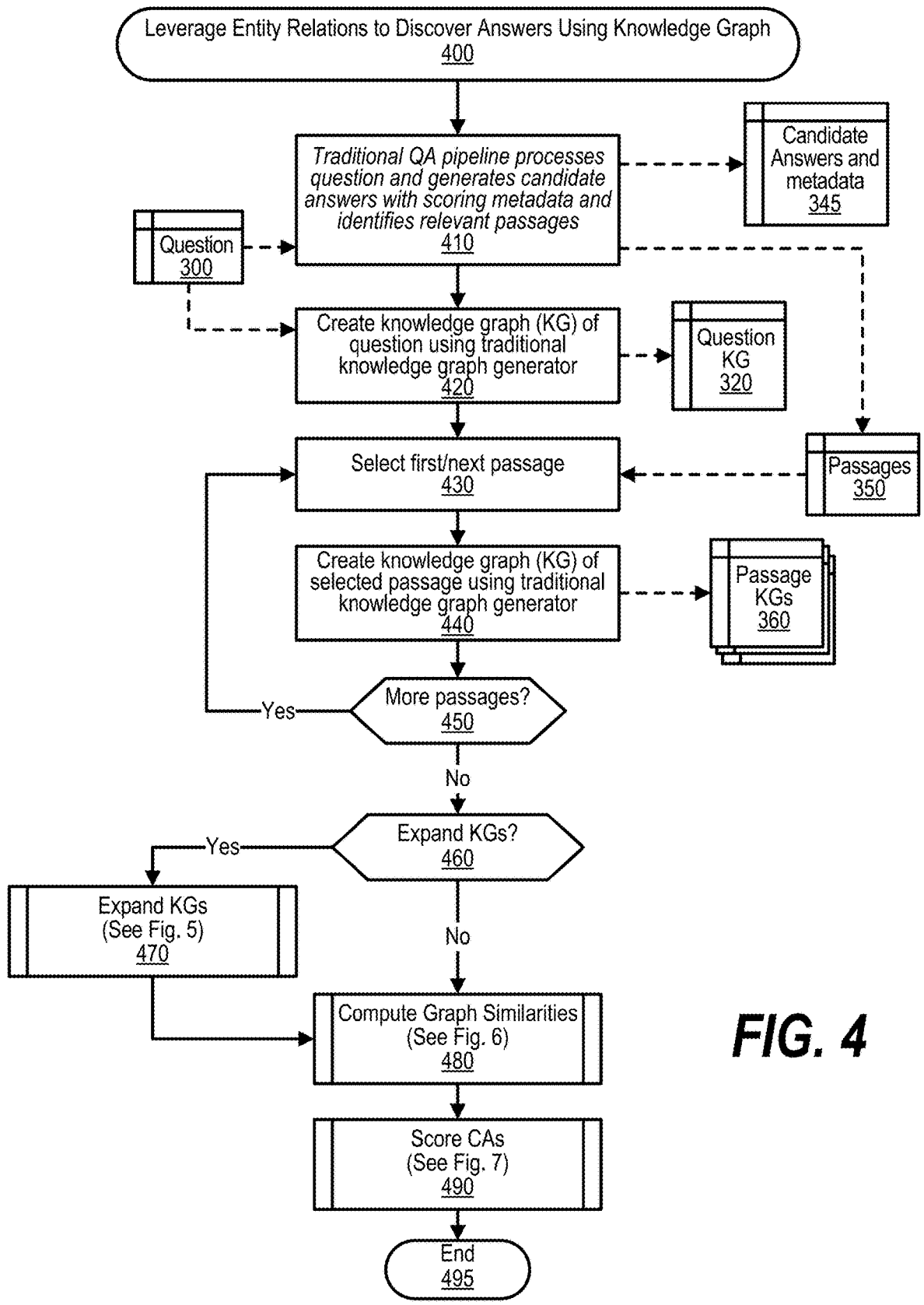
FIG. 4 is a depiction of a flowchart showing the logic used to leverage entity relations to discover answers using a knowledge graph.

FIG. 4 is a depiction of a flowchart showing the logic used to leverage entity relations to discover answers using a knowledge graph. FIG. 4 processing commences at 400 and shows the steps taken by a process that leverages entity relations to discover answers using knowledge graph data. At step 410, a traditional question-answer (QA) pipeline process is performed on submitted question 300. The traditional QA pipeline generates candidate answers with scoring metadata that are stored in memory area 345. In addition, the traditional QA pipeline process also identifies relevant passages that were used to generate the candidate answers with these relevant passages being stored in memory area 350.

At step 420, the process creates a knowledge graph (KG) of submitted question 300 using traditional a knowledge graph generator process. The created question KG is stored in memory area 320. At step 430, the process selects, from memory area 350, the first passage that was identified by the traditional QA pipeline process. At step 440, the process creates a knowledge graph (KG) of the selected passage using the traditional knowledge graph generator. The created passage KG is stored in memory areas 360 with one memory area being allocated for each passage KG. The process determines as to whether there are more passages to process and create passage knowledge graphs (decision 450). If there are more passages, then decision 450 branches to the 'yes' branch which loops back to step 430 to select the next passage and create its knowledge graph. This looping continues until all of the passages have been processed, at which point decision 450 branches to the 'no' branch exiting the loop.

Figure 5:
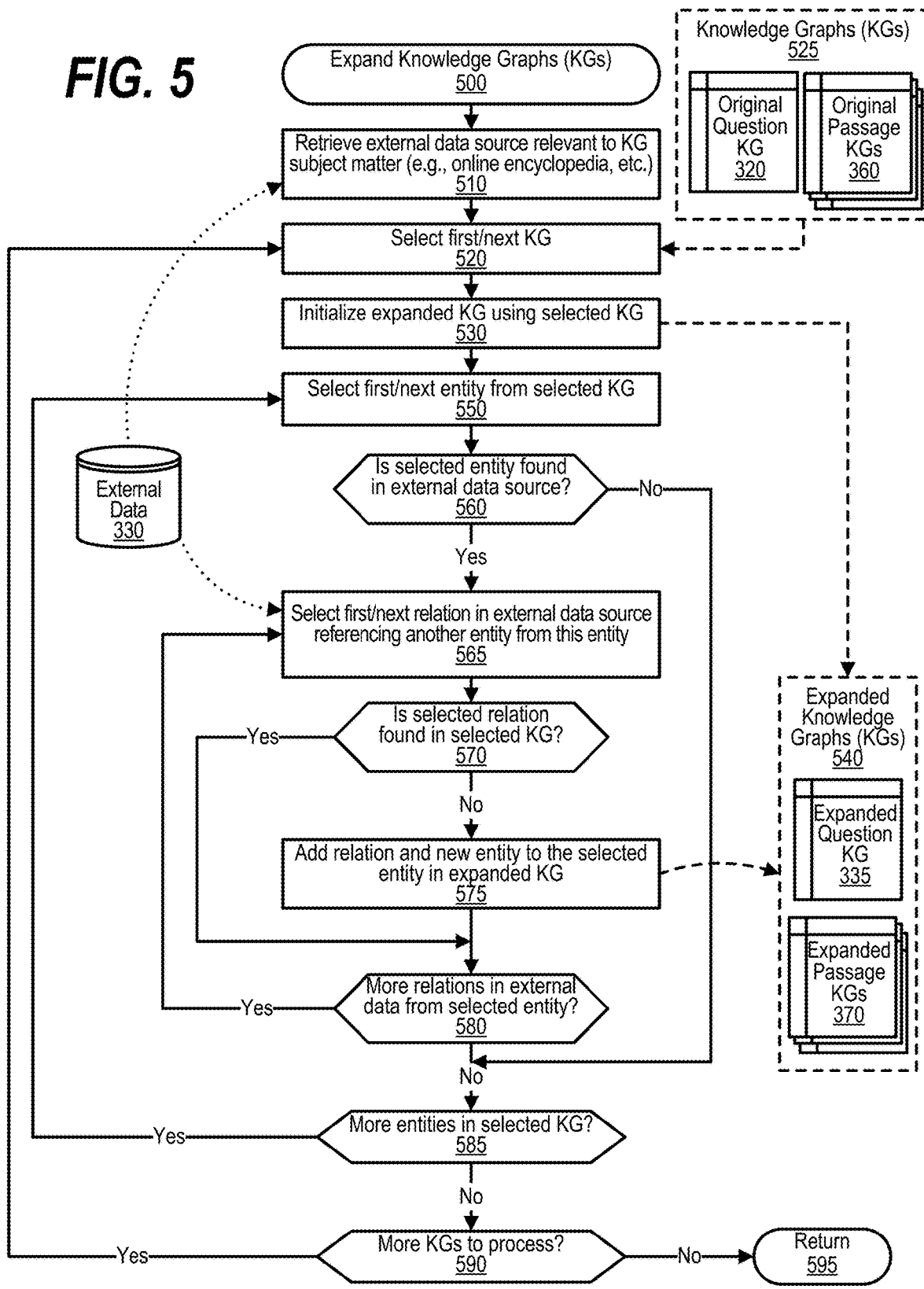
FIG. 5 is a depiction of a flowchart showing the logic used to expand knowledge graphs using data from external sources.

The process determines as to whether the generated knowledge graphs are to be "expanded" using a novel technique depicted in FIG. 5 (decision 460). Knowledge graph expansion uses a set of known data, such as an online encyclopedia, to add additional entities and relationships to the set of created knowledge graphs. The discovery of additional candidate answers can be performed without knowledge graph expansion. In some environments, however, expansion of knowledge graphs may provide additional candidate answers that are not apparent from the original knowledge graphs. In one embodiment, knowledge graph expansion is an option, such as a configuration setting or run-time option that can be chosen by an operator or requestor. If knowledge graph expansion is being used, then decision 460 branches to the 'yes' branch whereupon, at predefined process 470, the process performs the Expand KGs routine (see FIG. 5 and corresponding text for processing details). On the other hand, knowledge graph expansion is not being used, then decision 460 branches to the 'no' branch bypassing predefined process 470.

Figure 6:
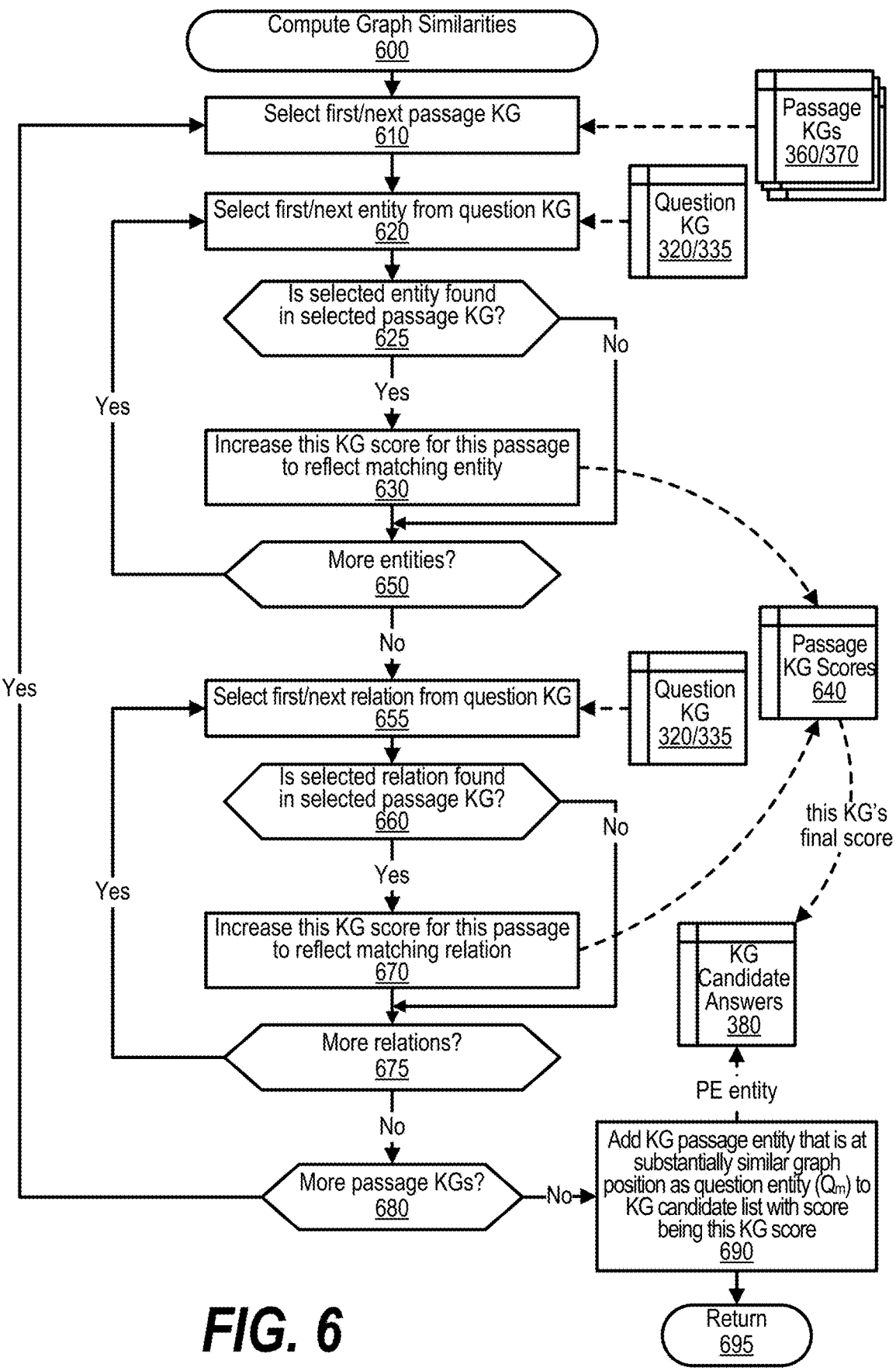
FIG. 6 is a depiction of a flowchart showing the logic used to compute similarities between knowledge graphs.

At predefined process 480, the process performs the Compute Graph Similarities routine (see FIG. 6 and corresponding text for processing details). This routine uses either expanded knowledge graphs (if predefined process was used) or the original knowledge graphs and computes graph similarities between the question KG and the passage KG to identify additional candidate answers.

Figure 7:
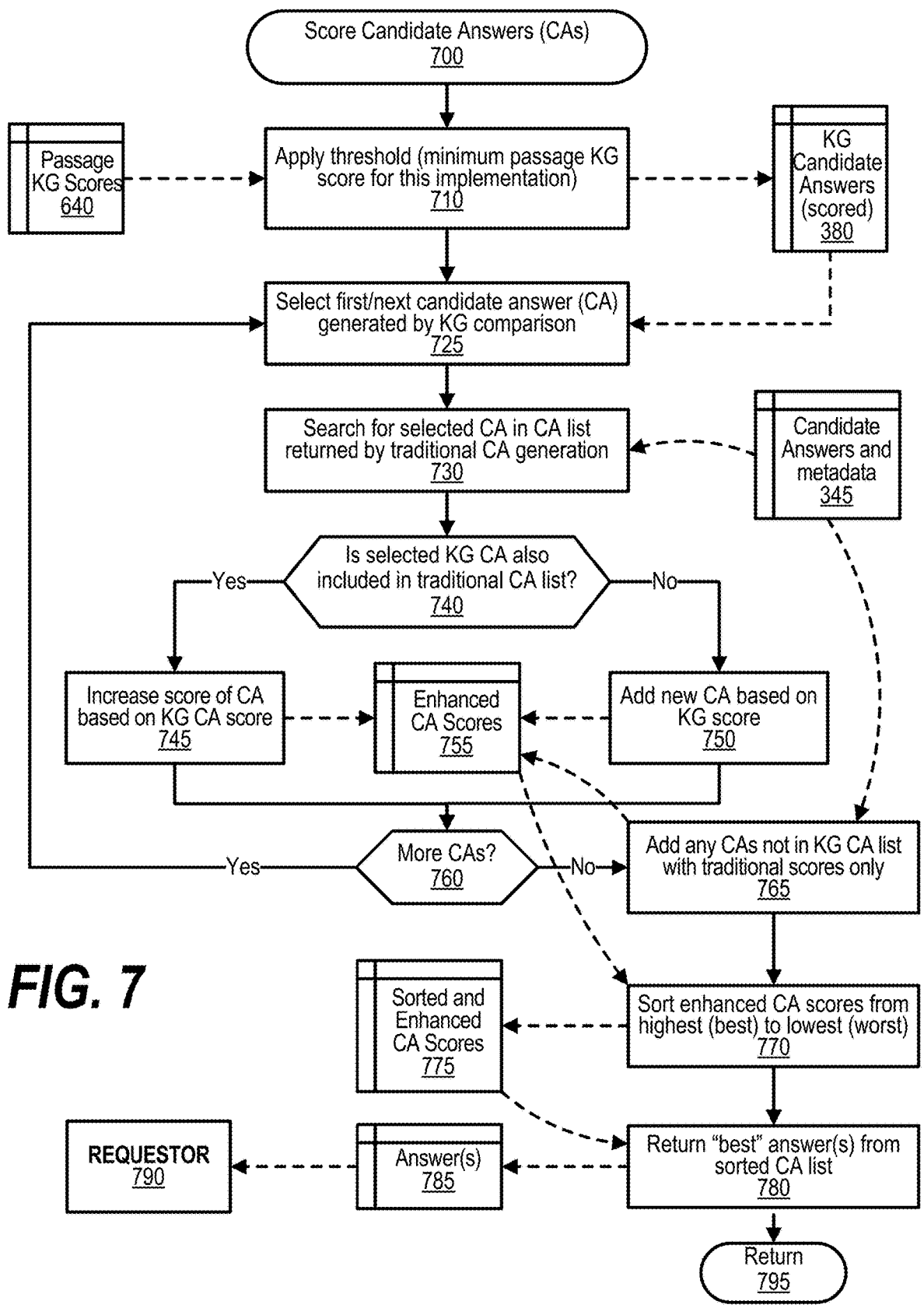
FIG. 7 is a depiction of a flowchart showing the logic used to score candidate answers (CAs) including CAs generated by leveraging entity relations found in knowledge graphs.

At predefined process 490, the process performs the Score Candidate Answers (CAs) routine (see FIG. 7 and corresponding text for processing details). This routine scores the candidate answers identified by computing graph similarities. In one embodiment, the routine boosts scores of candidate answers that were found by both the graph similarity process described herein as well as the traditional QA pipeline process. FIG. 4 processing thereafter ends at 495.

FIG. 5 is a depiction of a flowchart showing the logic used to expand knowledge graphs using data from external sources. FIG. 5 processing commences at 500 and shows the steps taken by a process that expands knowledge graphs (KGs) using one or more external data sources. At step 510, the process retrieves an external data source, such as an online encyclopedia, etc. In one embodiment, an external data source is chosen that is relevant to the subject matter of the submitted question and resulting passages. For example, if the question pertained to the medical field, then a medical external data source might be retrieved instead of, or in addition to, a general purpose online encyclopedia.

At step 520, the process selects the first knowledge graph from set of available knowledge graphs 525. The set of available knowledge graphs includes the original question KG 320 as well as the set of original passage KGs 360 that were generated by the process shown in FIG. 4. At step 530, the process initializes an expanded knowledge graph using the selected knowledge graph with the set of expanded knowledge graphs being stored in memory areas 540 and with the set of expanded knowledge graphs including the expanded question knowledge graph 335 and the set of expanded passage knowledge graphs 370. In one embodiment, initialization of the expanded knowledge graph includes copying the original knowledge graph to the expanded knowledge graph so that the expanded knowledge graph starts with a base of the original knowledge graph and expansion adds entities and relations to the original knowledge graph data. At step 550, the process selects the first entity from the selected knowledge graph. The process next determines whether the selected entity is found in the external data source (decision 560). If the selected entity is found in the external data source, then decision 560 branches to the 'yes' branch to perform step 565 through 580. On the other hand, if the selected entity was not found in the external data source, then decision 560 branches to the 'no' branch bypassing steps 565 through 580.

At step 565, the process selects the first relation (relationship) that is found in the external data source referencing another entity from this entity. The process determines as to whether the selected relation is also found in the selected knowledge graph (decision 570). If the selected relation is also found in the selected knowledge graph, then decision 570 branches to the 'yes' branch skipping this relation. On the other hand, if the selected relation is not found in the selected knowledge graph, meaning a new relation was discovered in the external data source, then decision 570 branches to the 'no' branch whereupon, at step 575, the process adds the newly found relation to the expanded knowledge graph and also adds the new entity that this relation connects to the existing relation from the original knowledge graph, thereby adding a new relation and a new entity not found in the original knowledge graph to the expanded knowledge graph. This new relation and new entity is added to memory area 540 (either the expanded question KG 335 if the original question KG is being processed, or one of the expanded passage KGs 370 if one of the original passage KGs is being processed).

The process determines whether there are more relations in the external data relating to the selected entity yet to be processed (decision 580). If there are more relations yet to be processed, then decision 580 branches to the 'yes' branch which loops back to step 565 to select and process the next relation as described above. This looping continues until all relations to the selected entity have been processed, at which point decision 580 branches to the 'no' branch exiting the loop.

The process next determines whether there are more entities found in the selected knowledge graph yet to be processed (decision 585). If there are more entities yet to be processed, then decision 585 branches to the 'yes' branch which loops back to step 550 to select and process the next entity as described above. This looping continues until all entities found in the selected knowledge graph have been processed, at which point decision 585 branches to the 'no' branch exiting the loop. Finally, the process determines whether there are more original knowledge graphs stored in memory areas 525 yet to be to processed (decision 590). If there are more original knowledge graphs yet to be to processed, then decision 590 branches to the 'yes' branch which loops back to step 520 to select and process the next original knowledge graph as described above. This looping continues until all of the original knowledge graphs have been processed, at which point decision 590 branches to the 'no' branch exiting the loop. FIG. 5 processing thereafter returns to the calling routine (see FIG. 4) at 595.

FIG. 6 is a depiction of a flowchart showing the logic used to compute similarities between knowledge graphs (KGs). FIG. 6 processing commences at 600 and shows the steps taken by a process that computes similarities between a question knowledge graph and the various passage knowledge graphs. At step 610, the process selects the first passage knowledge graph. Passage knowledge graphs can either be the original passage knowledge graphs 360 or, if graph expansion is utilized, than an expanded passage knowledge graph 370 is selected.

At step 620, the process selects the first entity from the question knowledge graph. Similar to passage knowledge graphs, the question knowledge graph can either be the original question knowledge graph 320 or, if graph expansion is utilized, than the expanded question knowledge graph 335 is selected. The process determines whether the selected entity is also found in the selected passage knowledge graph (decision 625). If the selected entity is also found in selected passage knowledge graph, then decision 625 branches to the 'yes' branch whereupon, at step 630, the process increases the score of this passage knowledge graph to reflect this passage knowledge graph's similarity to the question knowledge graph. The scores of the passage knowledge graphs are stored in memory area 640. On the other hand, if the selected entity from the question knowledge graph is not found in the selected passage knowledge graph, then decision 625 branches to the 'no' branch bypassing step 630.

The process determines whether there are more entities in the question knowledge graph to search for in the passage knowledge graph (decision 650). If there are more entities to search for in the passage knowledge graph, then decision 650 branches to the 'yes' branch which loops back to step 620 to select the next entity from the question knowledge graph. This looping continues until all of the entities from the question knowledge graph have been processed, at which point decision 650 branches to the 'no' branch exiting the loop.

Steps 655 through 675 process similarities in entity relationships in a similar manner to steps 620 through 650 that process the similarities of entities. At step 655, the process selects the first relation from the question knowledge graph (either original question KG 320 or expanded question KG 335). The process determines whether the selected relation is also found in the selected passage knowledge graph (decision 660). If the selected relation is also found in the selected passage knowledge graph, then decision 660 branches to the 'yes' branch whereupon, at step 670, the process increases the score of this passage knowledge graph to reflect this passage knowledge graph's similarity to the question knowledge graph. The scores of the passage knowledge graphs are stored in memory area 640. On the other hand, if the selected missing entity from the question knowledge graph is not found in the selected passage knowledge graph, then decision 660 branches to the 'no' branch bypassing step 670.

The process determines whether there are more relations in the question knowledge graph to search for in the passage knowledge graph (decision 650). If there are more relations to search for in the passage knowledge graph, then decision 675 branches to the 'yes' branch which loops back to step 655 to select the next relation from the question knowledge graph as described above. This looping continues until all of the relations from the question knowledge graph have been processed, at which point decision 675 branches to the 'no' branch exiting the loop.

The process determines as to whether there are more passage knowledge graphs yet to process to compute their similarities to the question knowledge graph as described above (decision 680). If there are more passage knowledge graphs yet to process, then decision 680 branches to the 'yes' branch which loops back to step 610 to select and process the next passage knowledge graph (either an original knowledge graph 360 or an expanded knowledge graph 370) as described above. This looping continues until all of the passage knowledge graphs have been processed, at which point decision 680 branches to the 'no' branch exiting the loop.

At step 690, the process adds any entities found in any of the passage knowledge graphs that are substantially similar to the missing (Qm) entity found in the question knowledge graph to the set of knowledge graph candidate answers with these entities found in the passage knowledge graphs being used as possible candidate answers. In one embodiment, the score of the passage knowledge graph (previously stored in memory area 640) is used to compute a score of the candidate answer with the candidate answer found from the knowledge graph comparison being stored in memory area 380. Passage knowledge graphs that do not have an entity substantially similar to the missing entity from the question knowledge graph are not used (discarded). FIG. 6 processing thereafter returns to the calling routine (see FIG. 4) at 695.

FIG. 7 is a depiction of a flowchart showing the logic used to score candidate answers (CAs) including candidate answers generated by leveraging entity relations found in knowledge graphs. FIG. 7 processing commences at 700 and shows the steps taken by a process that scores candidate answers (CAs) using information derived from knowledge graph comparisons that were shown in FIG. 6. At step 710, the process applies a threshold (e.g., a minimum passage knowledge graph (KG) score to use for this implementation, etc.).

At step 725, the process selects the first candidate answer that was generated by the knowledge graph comparison that was depicted in FIG. 6. The knowledge graph candidate answer is retrieved from memory area 380 and, if a threshold is applied, then the candidate answers retrieved from memory area 380 are those with a score that satisfies the threshold. At step 730, the process searches for the selected knowledge graph candidate answer in the candidate answer list that was generated by the traditional QA pipeline process with the candidate answers from the traditional QA pipeline process being retrieved from memory area 345.

The process next determines whether the selected candidate answer generated by the knowledge graph comparison process generated a candidate answer that was also generated by the traditional QA pipeline process (decision 740). If the selected candidate answer is found in both lists (generated by the knowledge graph comparison process and the traditional QA pipeline process), then decision 740 branches to the 'yes' branch whereupon step 745 is performed. In one embodiment, when a candidate answer is found in both lists, the score of the candidate answer is increased ("boosted") to reflect the discovery of the answer using both processes.

On the other hand, if the candidate answer is only found in the knowledge graph candidate answer list (memory area 380) and was not generated by the traditional QA pipeline process, then decision 740 branches to the 'no' branch whereupon, at step 750, the new candidate answer found by the knowledge graph comparison process is added to the list of potential candidate answers. The candidate answers and their respective scores are stored in memory area 755. In one embodiment, the scores of candidate answer found only by the candidate answer comparison process are based on the score that was calculated in FIG. 6 reflecting the similarity between the passage knowledge graph from which the candidate answer was found and the question knowledge graph.

The process next determines whether there are more candidate answers to process from list 380 that was generated by the knowledge graph comparison process shown in FIG. 6 (decision 760). If there are more candidate answers to process, then decision 760 branches to the 'yes' branch which loops back to step 725 to select and process the next candidate answer from list 380 as described above. This looping continues until all of the candidate answers from list 380 have been processed, at which point decision 760 branches to the 'no' branch exiting the loop.

At step 765, the process adds any candidate answers that were not in the knowledge graph candidate answer list (380) but were only discovered by the traditional QA pipeline process (stored in memory area 345 but not memory area 380). These additional candidate answers and their scores are copied to memory area 755 without enhancing ("boosting") their scores. At step 770, the process sorts the enhanced candidate answer scores from the highest (best) score to the lowest (worst) score. These sorted enhanced candidate answers and their respective scores are stored in memory area 775. At step 780, the process returns the one or more "best" answer(s) from the sorted enhanced candidate answer list now stored in memory area 775. The selected "best" answers are stored in memory area 785 and are returned to requestor 790 with the requestor being either a process or a user. FIG. 7 processing thereafter returns to the calling routine (see FIG. 4) at 795.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method implemented by an information handling system that includes a processor and a memory accessible by the processor, the method comprising:
   receiving a question at a question-answering (QA) system;
   identifying a plurality of passages relevant to the received question;
   generating a question knowledge graph corresponding to the received question and a plurality of passage knowledge graphs, wherein each of the passage knowledge graphs corresponds to one of the identified passages;
   comparing each of the passage knowledge graphs to the question knowledge graph, wherein the comparing results in a set of one or more knowledge graph candidate answers (kgCAs); and
   computing, using a QA pipeline without knowledge graph analysis, a set of candidate answers (CAs) and a candidate answer score corresponding to each of the CAs, wherein one or more of the candidate answer scores are enhanced when the corresponding CA is included in the set of kgCAs.

2. The method of claim 1 further comprising:
   locating a missing entity in the question knowledge graph, wherein the missing entity includes a first set of one or more relationships that are between the missing entity and one or more question entities also found in the question knowledge graph;
   identifying a passage entity that corresponds to the missing entity, wherein the identifying further comprises:
      matching the first set of relationships to a second set of relationships that are between the identified passage entity and one or more other passage entities to the relationships between; and
      adding the identified passage entity to the set of kgCAs.

3. The method of claim 1 further comprising:
   selecting a passage knowledge graph;
   comparing a set of passage entities and a set of passage relations found in the selected passage knowledge graph to a set of question entities and a set of question relations found in the question knowledge graph, the comparing resulting in a passage knowledge graph score that corresponds to the selected passage knowledge graph;
   repeating the selecting and comparing for each of the plurality of knowledge graphs; and
   computing a score corresponding to each of the kgCAs, wherein the computed score associated to each of the kgCAs is based on the passage knowledge graph score that corresponds to the passage knowledge graph where the respective kgCA was found.

4. The method of claim 1 further comprising:
generating an initial question knowledge graph based on the received question;
first expanding the initial question knowledge graph using at least one set of external data, wherein the question knowledge graph is the result of the first expansion;
generating a plurality of initial passage knowledge graphs, wherein each of the initial passage knowledge graphs is based on one of the identified passages; and
second expanding each of the initial passage knowledge graphs using the set of external data, wherein the plurality of passage knowledge graphs are the result of the second expansions.

5. The method of claim 1 wherein one of the plurality of passages is retrieved from an online encyclopedia.

6. An information handling system comprising:
one or more processors;
a memory coupled to at least one of the processors; and
a set of computer program instructions stored in the memory and executed by at least one of the processors in order to perform actions comprising:
receiving a question at a question-answering (QA) system;
identifying a plurality of passages relevant to the received question;
generating a question knowledge graph corresponding to the received question and a plurality of passage knowledge graphs, wherein each of the passage knowledge graphs corresponds to one of the identified passages;
comparing each of the passage knowledge graphs to the question knowledge graph, wherein the comparing results in a set of one or more knowledge graph candidate answers (kgCAs); and
computing, using a QA pipeline without knowledge graph analysis, a set of candidate answers (CAs) and a candidate answer score corresponding to each of the CAs, wherein one or more of the candidate answer scores are enhanced when the corresponding CA is included in the set of kgCAs.

7. The information handling system of claim 6 wherein the actions further comprise:
locating a missing entity in the question knowledge graph, wherein the missing entity includes a first set of one or more relationships that are between the missing entity and one or more question entities also found in the question knowledge graph;
identifying a passage entity that corresponds to the missing entity, wherein the identifying further comprises:
matching the first set of relationships to a second set of relationships that are between the identified passage entity and one or more other passage entities to the relationships between; and
adding the identified passage entity to the set of kgCAs.

8. The information handling system of claim 6 wherein the actions further comprise:
selecting a passage knowledge graph;
comparing a set of passage entities and a set of passage relations found in the selected passage knowledge graph to a set of question entities and a set of question relations found in the question knowledge graph, the comparing resulting in a passage knowledge graph score that corresponds to the selected passage knowledge graph;
repeating the selecting and comparing for each of the plurality of knowledge graphs; and
computing a score corresponding to each of the kgCAs, wherein the computed score associated to each of the kgCAs is based on the passage knowledge graph score that corresponds to the passage knowledge graph where the respective kgCA was found.

9. The information handling system of claim 6 wherein the actions further comprise:
generating an initial question knowledge graph based on the received question;
first expanding the initial question knowledge graph using at least one set of external data, wherein the question knowledge graph is the result of the first expansion;
generating a plurality of initial passage knowledge graphs, wherein each of the initial passage knowledge graphs is based on one of the identified passages; and
second expanding each of the initial passage knowledge graphs using the set of external data, wherein the plurality of passage knowledge graphs are the result of the second expansions.

10. The information handling system of claim 6 wherein one of the plurality of passages is retrieved from an online encyclopedia.

11. A computer program product stored in a computer readable storage medium, comprising computer program code that, when executed by an information handling system, performs actions comprising:
receiving a question at a question-answering (QA) system;
identifying a plurality of passages relevant to the received question;
generating a question knowledge graph corresponding to the received question and a plurality of passage knowledge graphs, wherein each of the passage knowledge graphs corresponds to one of the identified passages;
comparing each of the passage knowledge graphs to the question knowledge graph, wherein the comparing results in a set of one or more knowledge graph candidate answers (kgCAs); and
computing, using a QA pipeline without knowledge graph analysis, a set of candidate answers (CAs) and a candidate answer score corresponding to each of the CAs, wherein one or more of the candidate answer scores are enhanced when the corresponding CA is included in the set of kgCAs.

12. The computer program product of claim 11 wherein the actions further comprise:
locating a missing entity in the question knowledge graph, wherein the missing entity includes a first set of one or more relationships that are between the missing entity and one or more question entities also found in the question knowledge graph;
identifying a passage entity that corresponds to the missing entity, wherein the identifying further comprises:
matching the first set of relationships to a second set of relationships that are between the identified passage entity and one or more other passage entities to the relationships between; and
adding the identified passage entity to the set of kgCAs.

13. The computer program product of claim 11 wherein the actions further comprise:
selecting a passage knowledge graph;
comparing a set of passage entities and a set of passage relations found in the selected passage knowledge graph to a set of question entities and a set of question relations found in the question knowledge graph, the comparing resulting in a passage knowledge graph score that corresponds to the selected passage knowledge graph;

repeating the selecting and comparing for each of the plurality of knowledge graphs; and computing a score corresponding to each of the kgCAs, wherein the computed score associated to each of the kgCAs is based on the passage knowledge graph score that corresponds to the passage knowledge graph where the respective kgCA was found.

14. The computer program product of claim 11 wherein the actions further comprise:

generating an initial question knowledge graph based on the received question;

first expanding the initial question knowledge graph using at least one set of external data, wherein the question knowledge graph is the result of the first expansion;

generating a plurality of initial passage knowledge graphs, wherein each of the initial passage knowledge graphs is based on one of the identified passages; and second expanding each of the initial passage knowledge graphs using the set of external data, wherein the plurality of passage knowledge graphs are the result of the second expansions.

* * * * *